Dec. 12, 1961 K. BERGER 3,012,798
UNIVERSAL ELECTRIC SWIVEL JOINT
Filed March 13, 1957
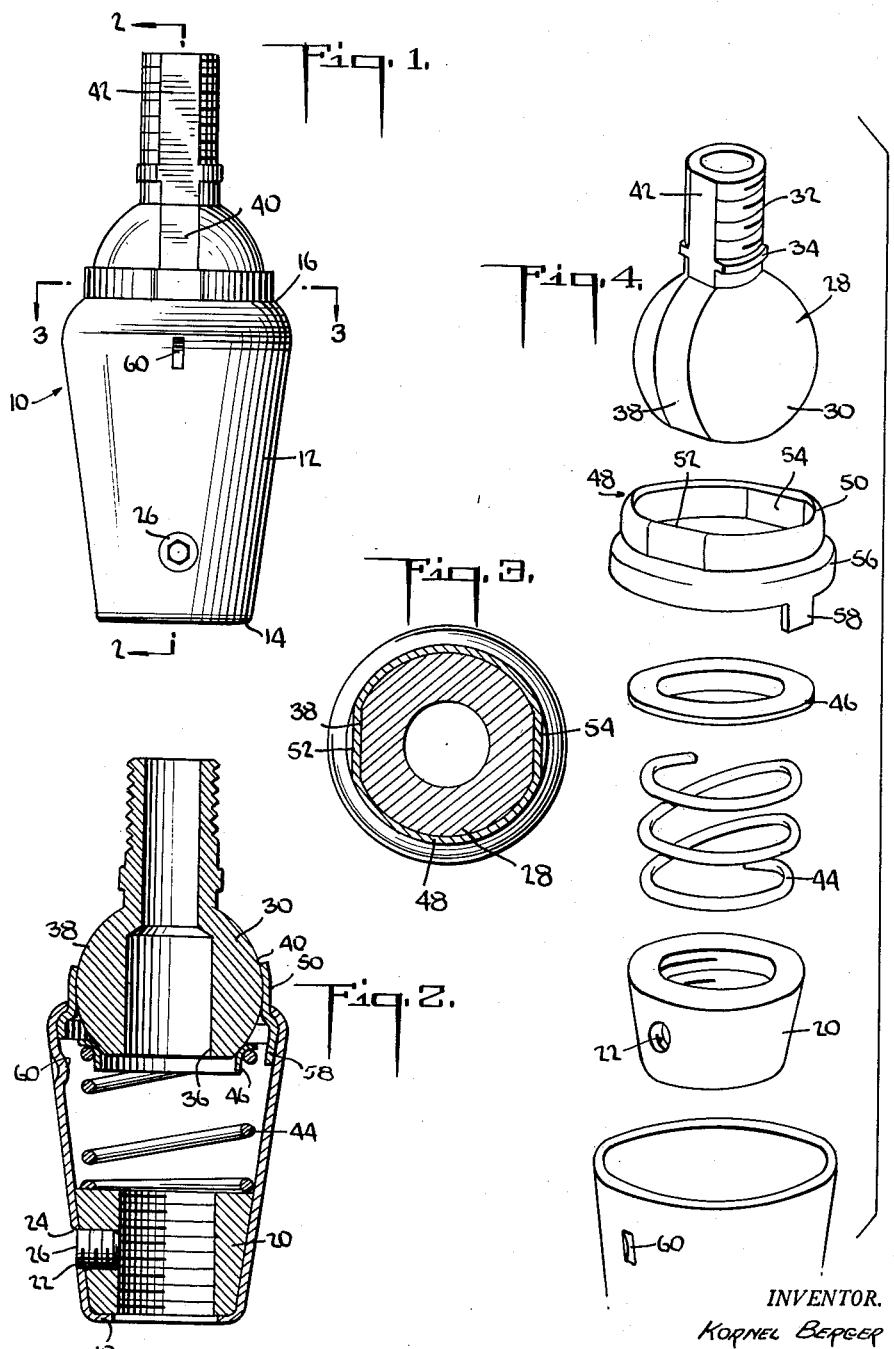
INVENTOR.
KORNEL BERGER
BY
ATTORNEYS United States Patent Office 3,012,798
Patented Dec. 12, 1961

3,012,798
UNIVERSAL ELECTRIC SWIVEL JOINT
Kornel Berger, Kew Gardens, N.Y. (% Berger Machine Products, Inc., 74—16 Grand Ave., Maspeth, N.Y.)
Filed Mar. 13, 1957, Ser. No. 645,807
3 Claims. (Cl. 285—264)

This invention relates to a universal electric swivel joint, and more particularly, to an electric ball swivel joint.

Electric ball swivel joints provide a particularly simple and highly efficient structure for permitting relative motion between two parts about three intersecting axes at right angles to one another. However, commercial joints of the character described are subject to a certain drawback which prevents their full acceptance, to wit, their inability to limit rotation about one of these axes to less than 360°.

It is the object of the present invention to provide a commercially acceptable ball swivel joint in which this drawback is overcome.

More particularly, it is an object of my invention to provide a modified practical ball joint in which relative rotation of the two parts of the joint about the longitudinal axis thereof is limited to less than 360°.

It is another object of my invention to provide an improved joint of the character described which has only a single simple added part, so that the cost of manufacturing the joint is not noticeably increased.

It is another object of my invention to provide an improved joint of the character described which is as rugged and inexpensive as a conventional present day commercial ball joint.

Other objects of my invention in part will be obvious and in part will be pointed out hereinafter.

My invention accordingly consists in the feature of construction, combinations of elements and arrangement of parts which will be exemplified in the joint hereinafter described and of which the scope of application will be indicated in the appended claims.

In the accompanying drawings in which is shown one of the various possible embodiments of my invention:

FIG. 1 is a side view of a ball joint construction in accordance with my present invention;

FIGS. 2 and 3 are, respectively, longitudinal and transverse sections through said joint, taken substantially along the lines 2—2 and 3—3 of FIG. 1; and FIG. 4 is an exploded perspective view of the joint.

Referring now in detail to the drawings, the reference numeral 10 denotes my new electric ball swivel. The same includes a casing 12 which, for the sake of appearance, is of frustoconical configuration, flaring from the narrow lower end 14 to a maximum diameter adjacent the upper end 16 near the center of the joint. The casing is provided with a lower inturned flange 18 (see FIG. 2) to facilitate seating of an internally tapped heavy wedge-shaped sleeve 20 which provides the screw connection conventionally found at the lower end of joints of this character. The sleeve is frictionally wedged into the casing so as, in effect, to form an integral part thereof. Optionally, it can be permanently secured in place, as by spot welding. The sleeve is provided with a lateral opening 22 in registry with an opening 24 in the casing to admit a set screw 26 which is threaded in the opening 22. Said set screw is employed to lock the joint in any given position on a member, as for instance, the threaded end of a pipe.

The joint further includes a ball 28 which may, if desired, constitute, as illustrated, a die casting, although it is within the scope of my invention to manufacture the same by turning, or from sheet metal by a series of forming operations such as are well known in the art. Said ball includes a hollow spherical portion 30 from which there extends a tubular threaded shank 32 provided with the usual shoulder 34. The bottom of the spherical portion is formed with a large opening 36 for passage of a wire extending through the joint.

In accordance with my present invention the spherical portion is fashioned with a pair of diametrically opposed flats 38, 40 that extend from the base of the shank to the lower open side of the ball. Although the width of the flats is not highly critical, there are certain controlling factors. Thus, the flats cannot be too narrow, or, as later will be seen, rotation would be permitted along the longitudinal axis of the joint between the ball and a contacting ring, the rotation being such that the flats then could shift from their illustrated position in which they ride along corresponding flats in the ring. Moreover, the flats cannot be too wide or they will prevent free rotation of the ball relative to the ring about an axis extending between the flats on the ring. By way of example, I have found that a satisfactory width of flat is one which subtends an arc of approximately 45°. This is close to the largest flat which I contemplate employing and variations therefrom preferably will be on the smaller side.

The shank also may include longitudinal flats 42, these being conventional and being provided to facilitate turning of the shank with respect to an electric fixture. The flats 42 may be coterminus with the flats 38, 40.

A compression spring 44 is located within the casing, having its lower end bearing against the top surface of the sleeve 20 and its upper end bearing against a ferrule 46, which in turn presses against the ball 30, as is conventional.

In a standard electric ball swivel joint the structure would be completed by a cap screwed on the upper end of the casing and having an opening somewhat less than the diameter of the ball, the latter being completely spherical, except for a lower opening and the threaded shank. My present construction differs from the foregoing not only in the provision of the flats 38, 40, but in the inclusion of a ring 48 designed to cooperate with said flats. Said ring conveniently may be fashioned from sheet metal and includes an upstanding collar 50 of generally circular outline, but provided with diametrically opposite internal flats 52, 54 which are shaped to match the flats 38, 40 on the ball. The collar is carried on an annular base 56 having a diameter somewhat in excess of that of the collar in order to facilitate engagement with the casing in a manner soon to be described. A leg 58 depends from the base.

The collar 50 is positioned and shaped to engage the ball slightly above a major diameter thereof. In other words, the internal surface of the flats 52, 54 are spaced apart a distance less than the maximum distance between the flats 38, 40. Although it is within the scope of my invention to provide such spacing between the flats 52, 54 of the ring, at that portion of the ring adjacent the base 56, I prefer to have the spacing present only at the upper end of the ring and thereby create a more attractive looking joint. This can be accomplished simply by slightly inwardly inclining the upper edge of the ring, i.e., by turning the same slightly inwardly so that the dimensions of the upper end of the ring are slightly less than the dimensions of the remaining parts of the ring. In this fashion, only the upper end of the ring need contact the ball around the entire periphery thereof.

The ring is optionally secured to the casing in any suitable manner which permits it to turn relative thereto about the longitudinal axis of the joint. For this purpose I may employ a screw-on cap which threadedly engages the casing and has an inturned flange to engage the base of the ring. However, the construction is simplified by utilizing the form illustrated, i.e., by inturning the upper end 16 of the casing, so that it snugly overlies the top surface of the base 56 adjacent the juncture with the collar 50. The inturning is performed by machine while the spring 44 is held under compression between the ball and sleeve so that in the finished joint the ball is pressed upwardly against the inturned upper end of the ring 48, being prevented from leaving the ring by the fact that the diameter of this end of the ring is smaller than a major diameter of the ball.

It will be apparent that with the construction above described the ball still is able to turn about three axes at right angles to one another. One of these is the longitudinal axis of the joint. When the ball turns about this axis it carries with it the ring 48 which is coupled to the ball by the mutual engagement between the flats 38, 40 on one hand and the flats 52, 54 on the other. The ring itself can turn about this axis under the inturned upper end 16 of the casing. Rotation of the ball about the other two axes takes place between the ball and the ring, the turning being about an axis passing between the flats 52, 54 and about an axis perpendicular to the other two axes. It will be appreciated that if the flats 52, 54 and the flats 38, 40 are too wide, this latter rotation is inhibited. It also should be pointed out that this latter rotation cannot take place unless the second and third axes are located only a slight distance above a major diameter of the ball. In other words, if these axes were located high on the ball, free rotation of the ball thereabout could not be accomplished. Accordingly, my invention contemplates disposing those axes of rotation of the ball which are transverse to the longitudinal axis of the casing, in such a position on the ball that they are at least a slight distance, e.g., 5/100ths of an inch, above the center of the ball. The actual above-center distance can be varied somewhat and may be larger if the collar 50 is more resilient, and less if said collar is less resilient. Moreover, if the ball is larger, the above-center distance may be correspondingly increased.

The casing 12 is formed with an internal abutment 60 against which the leg 58 is adapted to strike when the ring 48 turns. This limits rotation of the ball about the longitudinal axis of the casing to less than 360° and thus prevents a wire cord which extends through the joint from becoming twisted and broken.

It thus will be seen that I have provided a universal electric swivel joint and method of making the same which achieves the various objects of my invention and is well adapted to meet the conditions of practical use.

As various possible embodiments might be made of the above invention and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An electric ball swivel joint comprising a ball having a shank protruding therefrom and formed with an opening opposite the shank, said ball having a pair of diametrically opposite flats on its external surface extending from the shank to the opening, a ring having a pair of internal flats matching the flats on the ball so that relative movement between the ball and ring is prevented about an axis perpendicular to the plane of the ring, said ring having an internal diameter slightly smaller than the diameter of the ball so that the ball can be seated therein with the shank and a substantial part of the ball protruding outwardly from the ring, a casing having a flange at an end thereof engaged by an outward facing surface of the ring and against which the ring is rotatable, a spring under compression within the casing and urging the ball outwardly therefrom against the ring and the ring against the flange, a member movable with said ring, and a member movable with said casing in the path of travel of the member movable with said ring whereby to limit to less than 360° rotation of the ball relative to the casing about an axis between the ends of the casing.

2. An electric ball swivel joint comprising a ball having a shank protruding therefrom and formed with an opening opposite the shank, said ball having a pair of diametrically opposite uniform non-spherical portions on its external surface extending from the shank to the opening, a ring having a pair of internal non-spherical portions matching the non-spherical portions on the ball so that relative movement between the ball and ring is prevented about an axis perpendicular to the plane of the ring, said ring having an internal diameter slightly smaller than the diameter of the ball so that the ball can be seated therein with the shank and a substantial part of the ball protruding outwardly from the ring, a casing having a flange at an end thereof engaged by an outwardly facing surface of the ring and against which the ring is rotatable, a spring under compression within the casing and urging the ball outwardly therefrom against the ring and the ring against the flange, a member movable with said ring, and a member movable with said casing in the path of travel of the member movable with said ring whereby to limit to less than 360° rotation of the ball relative to the casing about an axis between the ends of the casing.

3. An electric ball swivel joint comprising a ball having a shank protruding therefrom and formed with an opening opposite the shank, said ball having an irregularity of uniform cross-section on its external surface extending away from the opening toward the shank, a ring having internally thereof a portion matching the cross-section of said irregularity and slidably ridable in the same so that relative movement between the ball and ring is prevented about an axis perpendicular to the plane of the ring, said ring having an internal diameter slightly smaller than the diameter of the ball so that the ball can be seated therein with the shank and a substantial portion of the ball protruding outwardly from the ring, a casing having a flange at an end thereof engaged by an outwardly facing surface of the ring and against which the ring is rotatable, a spring under compression within the casing and urging the ball outwardly therefrom against the ring and the ring against the flange, a member movable with said ring, and a member operationally integral with said casing in the path of travel of the member movable with said ring, whereby to limit to less than 360° rotation of the ball relative to the casing about the axis between the ends of the casing.

References Cited in the file of this patent

UNITED STATES PATENTS

| | | |
|---|---|---|
| 1,697,037 | Witz | Jan. 1, 1929 |
| 1,927,703 | Glowacki | Sept. 19, 1933 |
| 2,220,216 | Cloutier | Nov. 5, 1940 |
| 2,464,500 | Graham | Mar. 15, 1949 |
| 2,623,763 | Fauser | Dec. 30, 1952 |
| 2,670,228 | Pagliuso | Feb. 23, 1954 |
| 2,699,342 | May | Jan. 11, 1955 |
| 2,771,309 | Clark | Nov. 20, 1956 |
| 2,859,983 | May | Nov. 11, 1958 |
| 2,862,730 | Berger | Dec. 2, 1958 |

FOREIGN PATENTS

| | | |
|---|---|---|
| 707,434 | France | Apr. 14, 1931 |
| 1,018,869 | France | Oct. 22, 1952 |